US012542229B2

(12) United States Patent
Lee et al.

(10) Patent No.: US 12,542,229 B2
(45) Date of Patent: Feb. 3, 2026

(54) COIL COMPONENT

(71) Applicant: SAMSUNG ELECTRO-MECHANICS CO., LTD., Suwon-si (KR)

(72) Inventors: Seung Min Lee, Suwon-si (KR); Seung Mo Lim, Suwon-si (KR); Byung Soo Kang, Suwon-si (KR); No Il Park, Suwon-si (KR); Ju Hwan Yang, Suwon-si (KR); Yoon Mi Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 881 days.

(21) Appl. No.: 17/471,790

(22) Filed: Sep. 10, 2021

(65) Prior Publication Data

US 2022/0139606 A1 May 5, 2022

(30) Foreign Application Priority Data

Nov. 5, 2020 (KR) ........................ 10-2020-0146590

(51) Int. Cl.
*H01F 27/28* (2006.01)
*H01F 5/00* (2006.01)
(Continued)

(52) U.S. Cl.
CPC ......... *H01F 27/2804* (2013.01); *H01F 5/003* (2013.01); *H01F 17/0006* (2013.01);
(Continued)

(58) Field of Classification Search
CPC ......... H01F 27/2804; H01F 2027/2809; H01F 17/0013; H01F 17/0006; H01F 5/003; H01F 27/29; H01F 27/292; H01F 27/323
(Continued)

(56) References Cited

U.S. PATENT DOCUMENTS 9,076,586 B2 * 7/2015 Atsumi ................. H01F 27/292
2015/0048915 A1 * 2/2015 Yoon ................... H01F 17/0013 336/192

(Continued)

FOREIGN PATENT DOCUMENTS

JP 2003282333 A * 10/2003
JP 2012119533 A * 6/2012

(Continued)

OTHER PUBLICATIONS

Office Action issued in corresponding Korean Patent Application No. 10-2020-0146590 on Mar. 15, 2025, with English translation.

*Primary Examiner* — Tszfung J Chan
(74) *Attorney, Agent, or Firm* — MORGAN, LEWIS & BOCKIUS LLP

(57) ABSTRACT

A coil component includes a body including one surface, one end surface, the other end surface, one side surface, and the other side surface, a support substrate disposed in the body, a coil unit disposed on the support substrate and including first and second lead patterns, first and second slit portions respectively disposed in edge portions between each of the one end surface and the other end surface and the one surface , third and fourth slit portions respectively disposed in edge portions between each of the one side surface and the other side surface and the one surface, first and second external electrodes extending to the first and second slit portions to contact the first and second lead patterns, respectively. At least one of depths of the third and fourth slit portions is shallower than at least one of depths of the first and second slit portions.

25 Claims, 12 Drawing Sheets

(51) Int. Cl.
*H01F 17/00* (2006.01)
*H01F 27/29* (2006.01)
*H01F 27/32* (2006.01)
*H01F 41/12* (2006.01)

(52) U.S. Cl.
CPC ........... *H01F 27/29* (2013.01); *H01F 27/323* (2013.01); *H01F 2027/2809* (2013.01); *H01F 41/122* (2013.01)

(58) Field of Classification Search
USPC .................................................. 336/200, 232
See application file for complete search history.

(56) References Cited

U.S. PATENT DOCUMENTS

| | | | | |
|---|---|---|---|---|
| 2018/0182537 | A1* | 6/2018 | Shimizu | H01F 27/29 |
| 2020/0013540 | A1 | 1/2020 | Kang et al. | |
| 2020/0035401 | A1* | 1/2020 | Yoshinaka | H01F 27/324 |
| 2020/0035404 | A1* | 1/2020 | Lim | H01F 17/0013 |
| 2020/0098508 | A1 | 3/2020 | Park et al. | |
| 2020/0105452 | A1 | 4/2020 | Suzuki et al. | |
| 2020/0118729 | A1* | 4/2020 | Lim | H01F 27/324 |
| 2020/0312536 | A1 | 10/2020 | Park | |
| 2021/0057138 | A1* | 2/2021 | Yang | H01F 41/041 |
| 2021/0350980 | A1* | 11/2021 | Park | H01F 27/292 |
| 2021/0375529 | A1* | 12/2021 | Yang | H01F 27/292 |
| 2021/0383959 | A1* | 12/2021 | Lim | H01F 41/041 |

FOREIGN PATENT DOCUMENTS

| | | | | | |
|---|---|---|---|---|---|
| JP | 2013045871 | A | * | 3/2013 | |
| KR | 10-1548862 | B1 | | 8/2015 | |
| KR | 2015089279 | A | * | 8/2015 | H01F 17/0013 |
| KR | 2018012621 | A | * | 2/2018 | H01F 17/0013 |
| KR | 10-2020-0005011 | A | | 1/2020 | |
| KR | 10-2020-0033451 | A | | 3/2020 | |
| KR | 10-2020-0036750 | A | | 4/2020 | |
| KR | 10-2020-0041696 | A | | 4/2020 | |
| KR | 10-2020-0116237 | A | | 10/2020 | |
| WO | WO-2018186148 | A1 | * | 10/2018 | H01F 27/292 |

* cited by examiner

COIL COMPONENT

CROSS-REFERENCE TO RELATED APPLICATION

This application claims benefit of priority to Korean Patent Application No. 10-2020-0146590 filed on Nov. 5, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices along with a resistor and a capacitor.

As electronic devices increasingly have higher performance and become compact, a larger number of electronic components are used in electronic devices and electronic components and are reduced in size.

External electrodes of a coil component are typically formed on two surfaces of a body opposing each other in a length direction, respectively. In this case, an overall length or width of the coil component may increase due to a thickness of the external electrodes. In addition, when the coil component is mounted on a mounting board, the external electrodes of the coil component may come into contact with other components disposed adjacent to the mounting board, thereby causing an electrical short.

SUMMARY

An aspect of the present disclosure may provide a coil component whose characteristics are prevented from being degraded due to a leakage current.

According to an aspect of the present disclosure, a coil component may include: a body including one surface, one end surface and the other end surface connected to the one surface and opposing each other, and one side surface and the other side surface connecting the one surface and the other end surface, respectively, and opposing each other; a support substrate disposed in the body; a coil unit disposed on the support substrate and including first and second lead patterns; a first slit portion disposed in an edge portion between the one end surface of the body and the one surface of the body and exposing the first lead pattern; a second slit portion disposed in an edge portion between the other end surface of the body and the one surface of the body and exposing the second lead pattern;

a third slit portion disposed in an edge portion between the other side surface of the body and the one surface of the body; a fourth slit portion disposed in an edge portion between the other side surface of the body and the one surface of the body, at least one of depths of the third and fourth slit portions being shallower than at least one of depths of the first and second slit portions; first and second external electrodes spaced apart from each other on one surface of the body and extending to the first and second slit portions so as to be in contact with the first and second lead patterns, respectively;

and a surface insulating layer disposed on the body and disposed in at least portions of the first to fourth slit portions.

According to an aspect of the present disclosure, a coil component may include: a body including one surface, one end surface and the other end surface connected to the one surface, respectively, and opposing each other, and one side surface and the other side surface connecting the one end surface and the other end surface, respectively, and opposing each other; a support substrate disposed in the body; a coil disposed on the support substrate, and including a coil pattern and first and second lead patterns connected to the coil pattern; a first slit portion disposed in an edge portion between the one end surface of the body and the one surface of the body and exposing the first lead pattern; a second slit portion disposed in an edge portion between the other end surface of the body and the one surface of the body and exposing the second lead pattern; a third slit portion disposed in an edge portion between the one side surface of the body and the one surface of the body; a fourth slit portion disposed in an edge portion between the other side surface of the body and the one surface of the body; first and second external electrodes spaced apart from each other on the one surface of the body and extending to the first and second slit portions so as to be in contact with the first and second lead patterns, respectively; and a surface insulating layer disposed on the body and disposed in at least portions of the first to fourth slit portions. A distance from the coil pattern to the one surface is greater than depths of the third slit portion and the fourth slit portion.

According to an aspect of the present disclosure, a coil component may include: a body; a support substrate disposed in the body; a coil unit disposed on the support substrate and in the body; a first slit portion extending from a surface of the body to expose a portion of the coil unit and disposed on one side of the body in a length direction of the body; a second slit portion extending from the surface of the body and disposed on one side of the body in a width direction of the body; and an external electrode disposed on the surface of the body, and extending to the first slit portion so as to connect to the portion of the coil unit. A depth of the second slit portion is less than a depth of the first slit portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
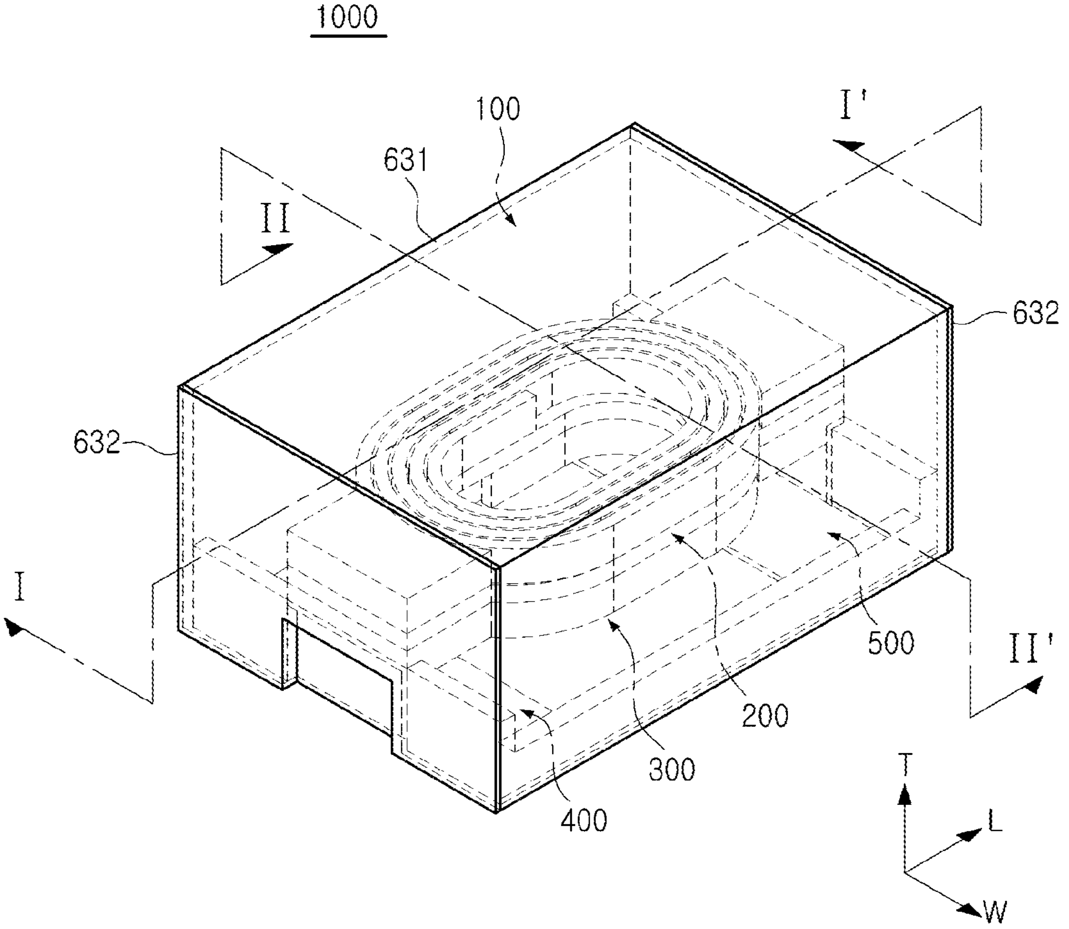
FIG. 1 is a view schematically illustrating a coil component according to a first exemplary embodiment in the present disclosure.

Exemplary embodiments in the present disclosure will now be described in detail with reference to the accompanying drawings.

In the drawings, an L direction may be defined as a first direction or a length direction, a W direction may be defined as a second direction or a width direction, and a T direction may be defined as a third direction or a thickness direction.

Hereinafter, a coil component according to an exemplary embodiment in the present disclosure will be described in detail with reference to the accompanying drawings, and in the description with reference to the accompanying drawings, the same or corresponding components are denoted by the same reference numerals and duplicate descriptions thereof will be omitted.

Various types of electronic components are used in electronic devices, and various types of coil components may be appropriately used between these electronic components to remove noise.

That is, in an electronic device, a coil component may be used as a power inductor, a high frequency (HF) inductor, a general bead, a high frequency bead (GHz bead), a common mode filter, and the like.

First Exemplary Embodiments and Modifications

Figure 2:
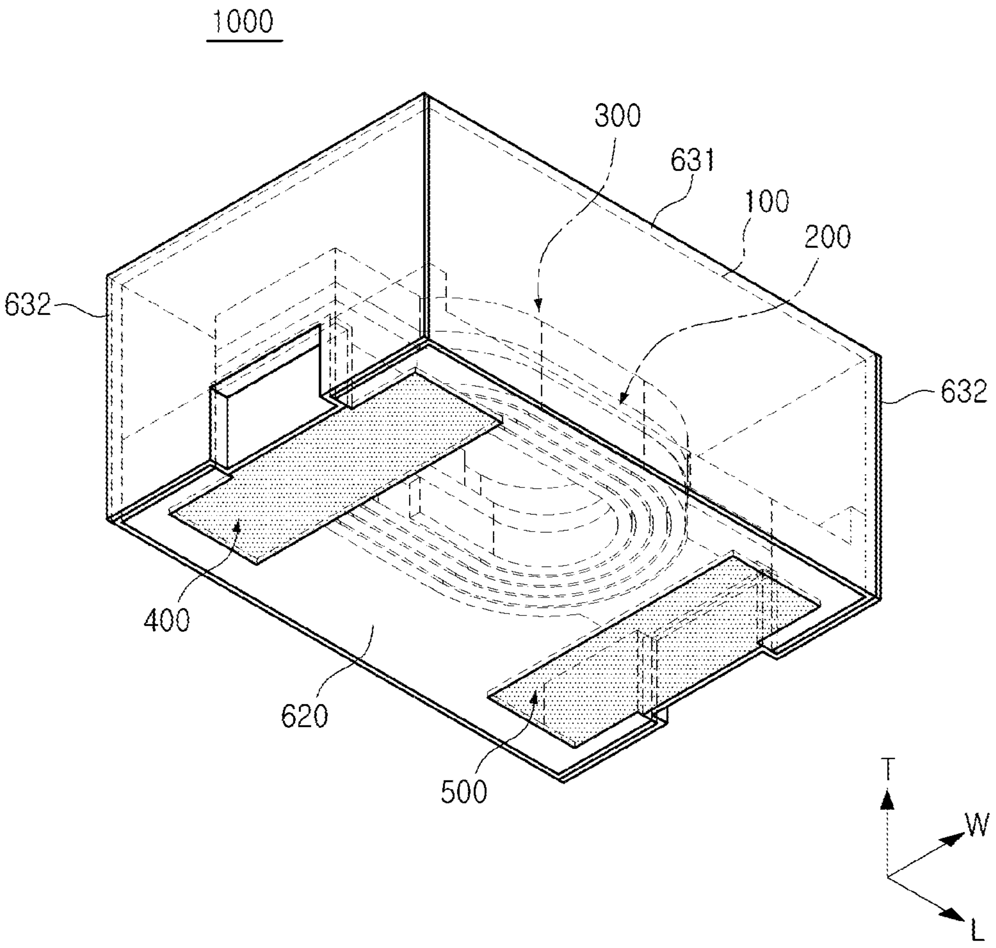
FIG. 2 is a bottom view of a coil component according to the first exemplary embodiment in the present disclosure.
Figure 3:
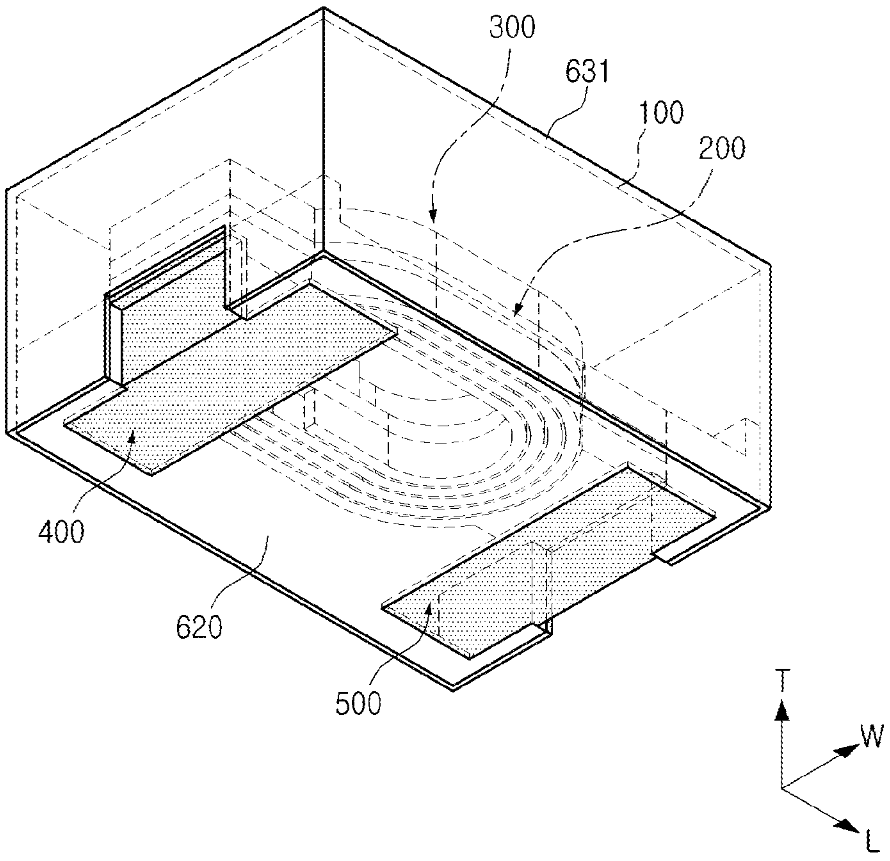
FIG. 3 is a view illustrating that a portion of a third insulating layer in FIG. 2 is omitted.
Figure 4:
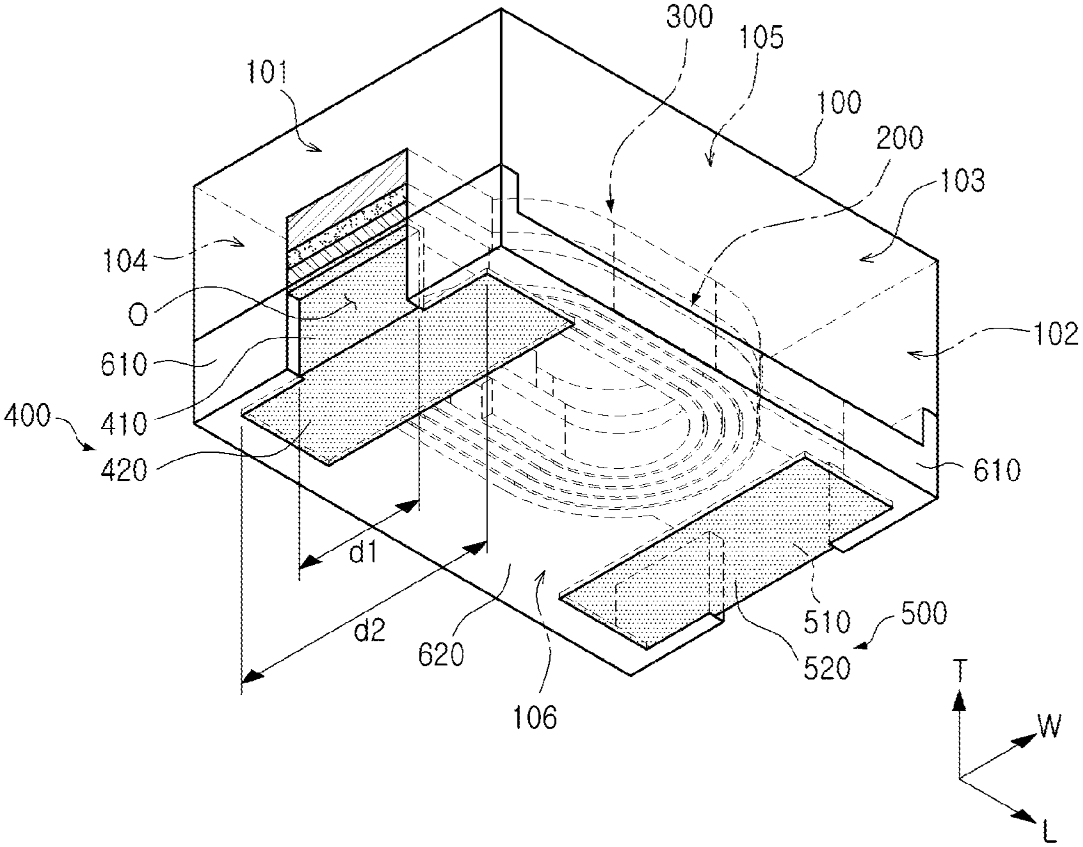
FIG. 4 is a view illustrating that the remainder of the third insulating layer in FIG. 3 is omitted.
Figure 5:
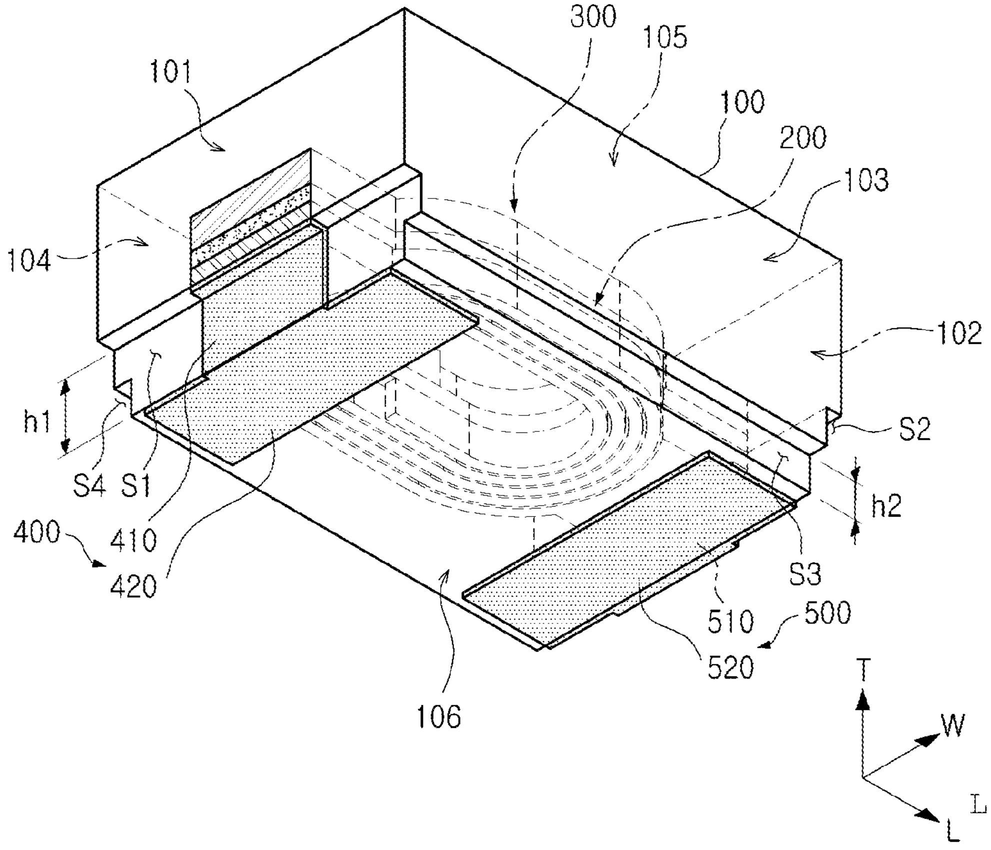
FIG. 5 is a view illustrating that first and second insulating layers in FIG. 4 are omitted.
Figure 6:
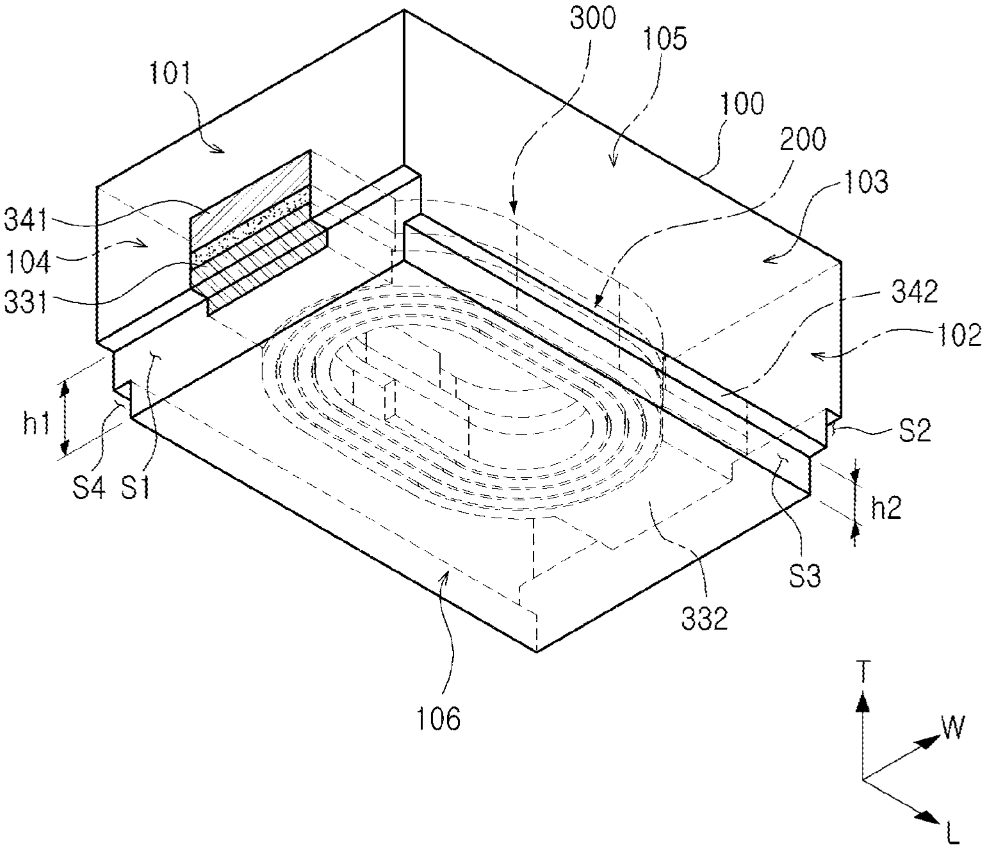
FIG. 6 is a view illustrating that an external electrode in FIG. 5 is omitted.
Figure 7:
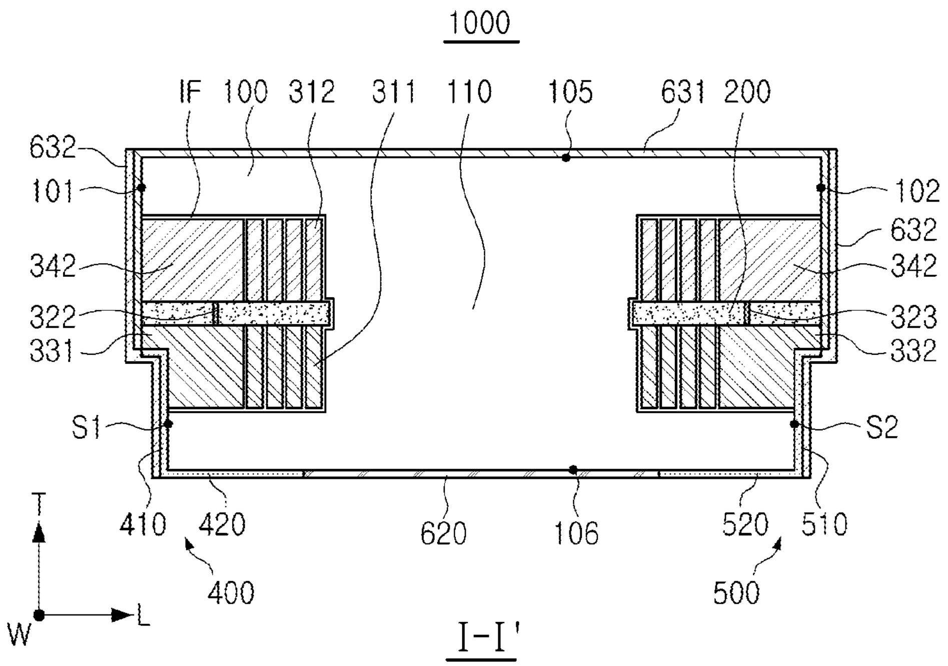
FIG. 7 is a cross-sectional view taken along line I-I' of FIG. 1.
Figure 8:
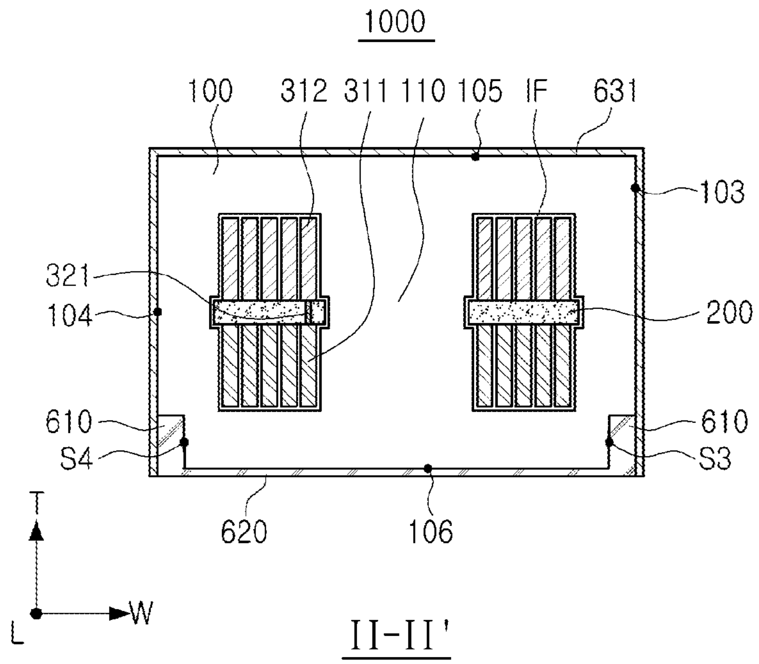
FIG. 8 is a cross-sectional view taken along line II-II' of FIG. 1.
Figure 9:
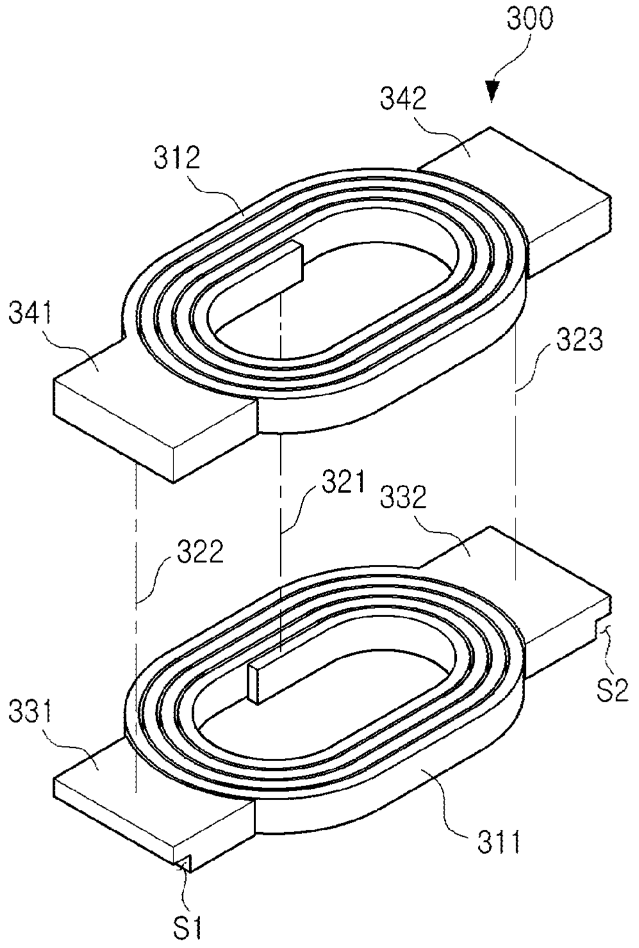
FIG. 9 is an exploded view of a coil unit.

FIG. 1 is a view schematically illustrating a coil component according to a first exemplary embodiment in the present disclosure. FIG. 2 is a bottom view of a coil component according to the first exemplary embodiment in the present disclosure. FIG. 3 is a view illustrating that a portion of a third insulating layer in FIG. 2 is omitted. FIG. 4 is a view illustrating that the remainder of the third insulating layer in FIG. 3 is omitted. FIG. 5 is a view illustrating that first and second insulating layers in FIG. 4 are omitted. FIG. 6 is a view illustrating that an external electrode in FIG. 5 is omitted. FIG. 7 is a cross-sectional view taken along line I-I' of FIG. 1. FIG. 8 is a cross-sectional view taken along line II-II' of FIG. 1. FIG. 9 is an exploded view of a coil unit.

Referring to FIGS. 1 through 9, a coil component 1000 according to an exemplary embodiment in the present disclosure may include a body 100, a support substrate 200, a coil unit 300, external electrodes 400 and 500, and insulating layers 610, 620, and 630, and may further include an insulating film IF.

The body 100 forms the exterior of the coil component 1000 according to the present exemplary embodiment, and the coil unit 300 and the support substrate 200 are disposed therein.

The body 100 may have a hexahedral shape as a whole.

In FIGS. 5 and 6, the body 100 includes a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 corresponds to a wall surface of the body 100 that connects the fifth surface 105 and the sixth surface 106 of the body 100. Hereinafter, both end surfaces (one end surface and the other end surface) of the body 100 may refer to the first surface 101 and the second surface 102 of the body and both side surfaces (one side surface and the other side surface) of the body 100 may refer to the third surface 103 and the fourth surface 104 of the body.

By way of example, the body 100 maybe formed such that the coil component 1000 according to the present exemplary embodiment including external electrodes 400 and 500 and insulating layers 610, 620, and 630 to be described later has a length of 2.0 mm, a width of 1.2 mm, and a thickness of 0.65 mm but is not limited thereto. Meanwhile, the aforementioned dimensions are merely design values that do not reflect process errors, etc., and thus, it should be appreciated that dimensions within a range admitted as a processor error fall within the scope of the present disclosure.

Based on an optical microscope or a scanning electron microscope (SEM) image for a length directional (L)-thickness directional (T) cross-section at a width-directional (W) central portion of the coil component 1000, the length of the coil component 1000 may refer to a maximum value among lengths of a plurality of segments parallel to the length direction L when outermost boundary lines of the coil component 1000 illustrated in the image of the cross-section are connected. Alternatively, the length of the coil component 1000 described above may refer to an arithmetic mean value of at least three of the plurality of segments parallel to the length direction L when the outermost boundary lines of the coil component 1000 illustrated in the cross-sectional image are connected.

Based on the optical microscope or SEM image for the length directional (L)-thickness directional (T) cross-section at the width-directional (W) central portion of the coil component 1000, the thickness of the coil component 1000 may refer to a maximum value among lengths of a plurality of segments parallel to the thickness direction T when outermost boundary lines of the coil component 1000 illustrated in the image of the cross-section are connected. Alternatively, the thickness of the coil component 1000 described above may refer to an arithmetic mean value of at least three of the plurality of segments parallel to the thickness direction T when the outermost boundary lines of the coil component 1000 illustrated in the cross-sectional image are connected.

Based on an optical microscope or SEM image fora length directional (L)-width directional (W) cross-section at a thickness-directional (T)-central portion of the coil component 1000, the width of the coil component 1000 may refer to a maximum value among lengths of a plurality of segments parallel to the width direction W when outermost boundary lines of the coil component 1000 illustrated in the image of the cross-section are connected. Alternatively, the width of the coil component 1000 described above may refer to an arithmetic mean value of at least three of the plurality of segments parallel to the width direction W when the outermost boundary lines of the coil component 1000 illustrated in the cross-sectional image are connected.

Alternatively, each of the length, width, and thickness of the coil component 1000 may be measured by a micrometer measurement method. With the micrometer measurement method, each of the length, width, and thickness of the coil component 1000 may be measured by setting a zero point with a gage repeatability and reproducibility (R&R) micrometer, inserting the coil component 1000 according to the present exemplary embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 may include a magnetic material and a resin. Specifically, the body 100 may be formed by stacking at least one magnetic composite sheet in which a magnetic material is dispersed in a resin. However, the body 100 may have a structure other than the structure in which a magnetic material is dispersed in a resin. For example, the body 100 may be formed of a magnetic material such as ferrite.

The magnetic material may be ferrite or metal magnetic powder.

Ferrite may be at least one of, for example, spinel type ferrite such as Mg-Zn-based ferrite, Mn-Zn-based ferrite, Mn-Mg-based ferrite, Cu-Zn-based ferrite, Mg-Mn-Sr-based ferrite, or Ni-Zn-based ferrite, hexagonal ferrites such as Ba-Zn-based ferrite, Ba-Mg-based ferrite, Ba-Ni-based ferrite, Ba-Co-based ferrite, or Ba-Ni-Co-based ferrite, garnet type ferrite such as Y-based ferrite, and Li-based ferrite.

Magnetic metal powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe-Si-based alloy powder, Fe-Si-Al-based alloy powder, Fe-Ni-based alloy powder, Fe-Ni-Mo-based alloy powder, Fe-Ni-Mo-Cu-based alloy powder, Fe-Co-based alloy powder, Fe-Ni-Co-based alloy powder, Fe-Cr-based alloy powder, Fe-Cr-Si alloy powder, Fe-Si-Cu-Nb-based alloy powder, Fe-Ni-Cr-based alloy powder, and Fe-Cr-Al-based alloy powder.

The magnetic metal powder may be amorphous or crystalline. For example, the magnetic metal powder may be Fe-Si-B-Cr-based amorphous alloy powder, but is not limited thereto.

Ferrite and the magnetic metal powder may each have an average diameter of about 0.1 pm to 30 pm, but are not limited thereto.

The body 100 may include two or more types of magnetic materials dispersed in a resin. Here, the different types of magnetic materials refer to that magnetic materials dispersed in a resin are distinguished from each other by any one of an average diameter, a composition, crystallinity, and a shape.

The resin may include, but is not limited to, epoxy, polyimide, liquid crystal polymer, or the like alone or as a mixture.

The body 100 includes a core 110 penetrating the support substrate 200 and the coil unit 300 to be described later. The core 110 may be formed by filling a through-hole through penetrating the central portion of each of the coil unit 300 and the support substrate 200 by the magnetic composite sheet, but is not limited thereto.

The first and second slit portions S1 and S2 are formed at edge portions between each of the first and second surfaces 101 and 102 of the body 100 and the sixth surface 106 of the body 100. Specifically, the first slit portion S1 is formed at the edge portion between the first surface 101 of the body 100 and the sixth surface 106 of the body 100, and the second slit portion S2 is formed at the edge portion between the second surface 102 of the body 100 and the sixth surface 106 of the body 100. Meanwhile, the first and second slit portions S1 and S2 may have depths by which lead patterns 331 and 332 to be described later are exposed to inner surfaces of the first and second slit portions S1 and S2 (hl, lengths of the first slit and second slit portions S1 and S2 based on the thickness direction T), but do not extend to the fifth surface 105 of the body 100. That is, the first and second slit portions S1 and S2 do not penetrate the body 100 in the thickness direction T.

The first and second slit portions S1 and S2 extend to the third and fourth surfaces 103 and 104 of the body 100 in the width direction W of the body 100, respectively. That is, the first and second slit portions S1 and S2 may have a shape of a slit formed along the entire width direction W of the body 100. The first and second slit portions S1 and S2 maybe formed by performing pre-dicing on one surface of a coil bar along boundaries corresponding to the width direction of each coil component, among boundary lines that individualize each coil component at a coil bar level before each coil component is individualized. A depth during pre-dicing is adjusted so that the lead patterns 331 and 332 are exposed.

The third and fourth slit portions S3 and S4 are formed at edge portions between each of the third and fourth surfaces 103 and 104 of the body 100 and the sixth surface 106 of the body 100, respectively. Specifically, the third slit portion S3 is formed at the edge portion between the third surface 103 of the body 100 and the sixth surface 106 of the body 100, and the fourth slit portion S4 is formed at the edge portion between the fourth surface 104 of the body 100 and the sixth surface 106 of the body 100.

The third and fourth slit portions S3 and S4 extend to the first and second surfaces 101 and 102 of the body 100 in the length direction L of the body 100 and are connected to the first and second slit portions S1 and S2, respectively. That is, the third and fourth slit portions S3 and S4 may have a shape of a slit formed in the entire length direction L of the body 100. The third and fourth slit portions S3 and S4 may be formed by performing pre-dicing on one surface of a coil bar along a boundary line corresponding to a length direction of each coil component among boundary lines individualizing each coil component at a coil bar level which is a state before each coil component is individualized. The third and fourth slit portions S3 and S4 do not extend to the fifth surface 105 of the body 100. The third and fourth slit portions S3 and S4 do not penetrate the body 100 in the thickness direction T.

In general, in a full-dicing process of separating a coil bar into a body of individual components, a dicing blade applies stress to the body. The stress caused by the dicing blade is concentrated on the edge portions and vertices of the lower surface of the body with respect to the lower surface of the body, and due to the stress, a region of the body is damaged or dropped out, causing a crack in the body to cause leakage current (chipping defect). In this exemplary embodiment, due to the slit portions S1, S2, S3, and S4 formed on the entire edge portions of the sixth surface 106 of the body 100, the sixth surface 106 of the body 100 is not in contact with a dicing blade of the full-dicing. As a result, in performing full-dicing along the boundary line that individualizes each coil component, an occurrence of cracks due to damage to or dropping of a region of the sixth surface 106 of the body 100 may be prevented. In addition, it is possible to reduce an occurrence of leakage current due to cracks.

A depth h2 of each of the third and fourth slit portions S3 and S4 may be shallower than the depth h1 of the first and second slit portions S1 and S2. The first and second slit portions S1 and S2 need to expose the lead patterns 331 and 332 to inner surfaces thereof to connect the lead patterns 331 and 332 and the external electrodes 400 and 500 to be described later, the depth h1 of the first and second slit portions S1 and S2 should have a value equal to or greater than a distance from at least one surface of the body 100 to the lead patterns 331 and 332. However, since the third and fourth slit portions S3 and S4 do not expose the lead patterns 331 and 332, the depth h2 thereof may be shallower than the depth h1 of the first and second slits as long as it satisfies a condition exceeding 0. In this case, loss of the magnetic material of the body 100 caused due to the formation of the third and fourth slit portions S3 and S4 may be minimized. That is, it is possible to minimize loss of the magnetic material of the body, while minimizing a chipping defect.

Meanwhile, inner surfaces of the slit portions S1, S2, S3, and S4 also configure the surface of the body 100, but in the present disclosure, for convenience of description, the inner surfaces of the slit portions S1, S2, S3, and S4 are distinguished from the surface of the body 100. In addition, in FIGS. 5 through 7, it is illustrated that the first and second slit portions S1 and S2 have inner walls parallel to the first and second surfaces 101 and 102 of the body 100 and bottom surfaces parallel to the fifth and sixth surfaces 105 and 106 of the body 100, but this is for convenience of description and the scope of the present exemplary embodiment is not limited thereto. As an example, the first slit portion S1 may have an inner surface in a curved shape connecting the first surface 101 and the sixth surface 106 of the body 100 with respect to the length directional-thickness directional cross-section (LT cross-section) of the coil component 1000 according to the present exemplary embodiment. The description of the first and second slit portions S1 and S2 may also be equally applied to the third and fourth slit portions S3 and S4. Hereinafter, for convenience of description, it will be described that the slit portions S1, S2, S3, and S4 have inner walls and bottom surfaces.

The support substrate 200 is embedded in the body 100. The support substrate 200 is configured to support the coil unit 300 to be described later.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of insulating materials such as prepreg, Ajinomoto build-up film (ABF), FR-4, a bismaleimide triazine (BT) resin, photo imageable dielectric (PID), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. If the support substrate 200 is formed of an insulating material that does not contain glass fibers, the support substrate 200 is advantageous in reducing the thickness of the coil component 1000 according to the present exemplary embodiment. In addition, a volume occupied by the coil unit 300 and/or the magnetic material may be increased based on the body 100 having the same size, thereby improving component characteristics. When the support substrate 200 is formed of an insulating material including a photosensitive insulating resin, the number of processes for forming the coil unit 300 may be reduced, which is advantageous in reducing production cost and forming fine vias.

The coil unit 300 is disposed inside the body 100 to manifest the characteristics of the coil component. For example, when the coil component 1000 of the present exemplary embodiment is used as a power inductor, the coil unit 300 may serve to stabilize power of an electronic device by storing an electric field as a magnetic field and maintaining an output voltage.

The coil unit 300 includes coil patterns 311 and 312, vias 321, 322 and 323, lead patterns 331 and 332, and dummy lead patterns 341 and 342. Specifically, with respect to the direction of FIGS. 1, 7, and 8, the first coil pattern 311, the first lead pattern 331, and the second lead pattern 332 are arranged on a lower surface of the support substrate 200 opposing the sixth surface 106 of the body 100, and the second coil pattern 312, the first dummy lead pattern 341, and the second dummy lead pattern 342 are arranged on an upper surface of the support substrate 200 opposing a lower surface of the support substrate 200. On the lower surface of the support substrate 200, the first coil pattern 311 is spaced apart from the first lead pattern 331 and in contact with and connected to the second lead pattern 332. On the upper surface of the support substrate 200, the second coil pattern 312 is in contact with and connected to the first dummy lead pattern 341 and spaced apart from the second dummy lead pattern 342. The first via 321 is in contact with and connected to an inner end of each of the first coil pattern 311 and the second coil pattern 312 through the support substrate 200. The second via 322 is in contact with and connected to the first lead pattern 331 and the first dummy lead pattern 341 through the support substrate 200. The third via 323 is in contact with and connected to the second lead pattern 332 and the second dummy lead pattern 342 through the support substrate 200. Accordingly, the coil unit 300 may function as a single coil as a whole.

Each of the first coil pattern 311 and the second coil pattern 312 may have a shape of a flat spiral in which at least one turn is formed around the core 110. For example, the first coil pattern 311 may form at least one turn around the core 110 on the lower surface of the support substrate 200.

The first lead pattern 331 and the second lead pattern 332 are exposed to the first and second slit portions S1 and S2. Specifically, the first lead pattern 331 is exposed to an inner surface of the first slit portion S1, and the second lead pattern 332 is exposed to an inner surface of the second slit portion S2. Since the connection portions 410 and 510 of the external electrodes 400 and 500 to be described later are disposed in the first and second slit portions S1 and S2, the coil unit 300 and the external electrodes 400 and 500 are in contact with and connected to each other. Meanwhile, hereinafter, for convenience of description, as shown in FIGS. 5 to 7 and 9, it is assumed that the first and second slit portions S1 and S2 extend to an inner side of at least a portion of each of the lead patterns 331 and 332 so that the lead patterns are exposed to an inner wall and a bottom surface of the first and second slit portions S1 and S2, but this is only exemplary and the scope of this exemplary embodiment Is not limited thereto. That is, the depth h1 of the first and second slit portions S1 and S2 may be adjusted so that the lead patterns 331 and 332 are exposed only to the bottom surfaces of the first and second slit portions S1 and S2. Meanwhile, when the lead patterns 331 and 332 are exposed to both the bottom surfaces and inner walls of the first and second slit portions S1 and S2, contact areas between the connection portions 410 and 510 of the lead patterns 331 and 332 and the external electrodes 400 and 500 may increase to increase a coupling force between the coil unit 300 and the external electrodes 400 and 500.

One surfaces of the lead patterns 331 and 332 exposed to the inner surfaces of the first and second slit portions S1 and S2 may have higher surface roughness than the other surfaces of the lead patterns 331 and 332. For example, in the case of forming the first and second slit portions S1 and S2 on the lead patterns 331 and 332 and the body 100 after the lead patterns 331 and 332 are formed by electroplating, portions of the lead patterns 331 and 332 may be removed in a slit portion forming process. Accordingly, one surfaces of the lead patterns 331 and 332 exposed to the inner walls and bottom surfaces of the first and second slit portions S1 and S2 may have high surface roughness due to polishing of a dicing tip, compared with the other surfaces of the lead patterns 331 and 332. As described later, the external electrodes 400 and 500 are formed as thin films so bonding force thereof with the body 100 may be weak. However, since the external electrodes 400 and 500 are in contact with and connected to one surfaces of the lead patterns 331 and 332 having relatively high surface roughness, a coupling force between the external electrodes 400 and 500 and the lead patterns 331 and 332 may be improved.

The lead patterns 331 and 332 and the dummy lead patterns 341 and 342 are exposed to the first and second surfaces 101 and 102 of the body 100, respectively. That is, the first lead pattern 331 is exposed to the first surface 101 of the body 100, and the second lead pattern 332 is exposed to the second surface 102 of the body 100. The first dummy lead pattern 341 is exposed to the first surface 101 of the body 100, and the second dummy lead pattern 342 is exposed to the second surface 102 of the body 100. Accordingly, as shown in FIG. 6, the first lead pattern 331 is continuously exposed to the inner wall of the first slit portion S1, the bottom surface of the first slit portion S1, and the first surface 101 of the body 100, and the second lead pattern 332 is continuously exposed to the inner wall of the second slit portion S2, the bottom surface of the second slit portion S2, and the second surface 102 of the body 100.

At least one of the coil patterns 311 and 312, the vias 321, 322, and 323, the lead patterns 331 and 332, and the dummy lead patterns 341 and 342 may include at least one conductive layer.

As an example, when the second coil pattern 312, the dummy lead patterns 341 and 342, and the vias 321, 322, and 323 are formed by plating on the upper surface side of the support substrate 200, the second coil pattern 312, the dummy lead patterns 341 and 342, and the vias 321, 322, and 323 may each include a seed layer and an electroplating layer. Here, the electroplating layer may have a single layer structure or a multilayer structure. The multilayered electroplating layer may be formed in a conformal film structure in which another electroplating layer is formed along a surface of any one electroplating layer or may be formed in a shape in which another electroplating layer is stacked only on one surface of any one electroplating layer. The seed layer may be formed by an electroless plating method or a vapor deposition method such as sputtering. The seed layer of the second coil pattern 312, the seed layer of the dummy lead patterns 341 and 342, and the seed layer of the vias 321, 322, and 323 may be formed integrally so that a boundary may not be formed therebetween, but is not limited thereto. The electroplating layer of the second coil pattern 312, the electroplating layer of the dummy lead patterns 341 and 342, and the electroplating layer of the vias 321, 322, and 323 may be integrally formed so that a boundary may not be formed therebetween, but is not limited thereto.

As another example, when the coil unit 300 is formed by separately forming the first coil pattern 311 and the lead patterns 331 and 332 disposed on the lower surface side of the support substrate 200 and the second coil pattern 312 and the dummy lead patterns 341 and 342 disposed on the upper surface side of the support substrate 200 and subsequently collectively stacking the first coil pattern 311 and the lead patterns 331 and 332 and the second coil pattern 312 and the dummy lead patterns 341 and 342 on the support substrate 200, the vias 321, 322, and 323 may include a high melting point metal layer and a low melting point metal layer having a melting point lower than that of the high melting point metal layer. Here, the low melting point metal layer may be formed of solder including lead (Pb) and/or tin (Sn). At least a part of the low melting point metal layer may be melted due to pressure and temperature at the time of collectively stacking to form, for example, an intermetallic compound (IMC) layer at a boundary between the low melting point metal layer and the second coil pattern 312.

As shown in FIGS. 7 and 8, as an example, the coil patterns 311 and 312, the lead patterns 331 and 332 and the dummy lead patterns 341 and 342 may be formed on and protrude from the lower surface and the upper surface of the support substrate 200, respectively. As another example, the first coil pattern 311 and the lead patterns 331 and 332 may protrude from the lower surface of the support substrate 200, and the second coil pattern 312 and the dummy lead patterns 341 and 342 may be embedded in the upper surface of the support substrate 200 and upper surfaces of the second coil pattern 312 and the dummy lead patterns 341 and 342 maybe exposed to the upper surface of the support substrate 200. In this case, a concave portion maybe formed on the upper surface of the second coil pattern 312 and/or on the upper surfaces of the dummy lead patterns 341 and 342, so that the upper surface of the support substrate 200 and the upper surface of the second coil pattern 312 and/or the upper surfaces of the dummy lead patterns 341 and 342 may not be coplanar.

The coil patterns 311 and 312, the vias 321, 322, and 323, the lead patterns 331 and 332, and the dummy lead patterns 341 and 342 may each be formed of a conductive material such as copper (Cu), aluminum (Al), silver (Ag), tin (Sn), gold (Au), nickel (Ni), lead (Pb), titanium (Ti), chromium (Cr), or an alloy thereof, but is not limited thereto.

The external electrodes 400 and 500 are disposed to be spaced apart from each other on the sixth surface 106 of the body and extend toward the first and second slit portions S1 and S2, respectively, so as to be in contact with the first and second lead patterns 331 and 332. The external electrodes 400 and 500 include connection portions 410 and 510 disposed in the slit portions S1 and S2 and connected to the coil unit 300 and pad portions 420 and 520 disposed on the sixth surface 106 of the body 100. Specifically, the first external electrode 400 includes a first connection portion 410 disposed on the bottom surface and the inner wall of the first slit portion S1 and in contact with and connected to the first lead pattern 331 of the coil unit 300 and a first pad portion 420 disposed on the sixth surface 106 of the body 100. The second external electrode 500 includes a second connection portion 510 disposed on the bottom surface and the inner wall of the second slit portion S2 and in contact with and connected to the second lead pattern 332 of the coil unit 300 and a second pad portion 520 disposed on the sixth surface 106 of the body 100. The first pad portion 420 and the second pad portion 520 are disposed to be spaced apart from each other on the sixth surface of the body 100.

The external electrodes 400 and 500 are formed on the bottom surfaces and inner walls of the slit portions S1 and S2 and the sixth surface 106 of the body 100, respectively. That is, the external electrodes 400 and 500 are formed in the form of conformal films on the inner surfaces of the slit portions S1 and S2 and the sixth surface 106 of the body 100. The connection portion 410 and the pad portion 420 of the external electrode 400 are formed together in the same process and may be integrally formed on the inner surface of the slit portion S1 and the sixth surface 106 of the body 100, and the connection portion 510 and the pad portion 520 of the external electrode 500 are formed together in the same process and may be integrally formed on the inner surface of the slit portion S2 and the sixth surface 106 of the body 100. That is, a boundary may not be formed between the connection portion 410 and the pad portion 420, and a boundary may not be formed between the connection portion 510 and the pad portion 520.

The external electrodes 400 and 500 may be formed by a vapor deposition method such as sputtering and/or a plating method, but the method is not limited thereto.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or an alloy thereof, but is not limited thereto. The external electrodes 400 and 500 may have a single layer or multi-layer structure. As an example, the external electrodes 400 and 500 are sequentially formed by plating on the pad portions 420 and 520 including copper (Cu) and may include first and second layers including nickel (Ni) and tin (Sn), respectively, but the structure is not limited thereto.

The connection portions 410 and 510 may be disposed at the central portion of the first and second slit portions 51 and S2 so as to be spaced apart from the third and fourth surfaces 103 and 104 of the body 100, respectively. That is, the connection portions 410 and 510 may be respectively disposed at the central portions of the inner surfaces of the first and second slit portions S1 and S2 in the width direction W. Since the lead patterns 331 and 332 are respectively exposed to the central portions of the inner surfaces of the first and second slit portions S1 and S2 in the width direction W, the connection portions 410 and 510 may be respectively formed only in the regions of the inner surfaces of the first and second slit portions S1 and S2 in which the lead patterns 331 and 332 are respectively exposed.

The pad portions 420 and 520 may be disposed on the sixth surface 106 of the body 100 and spaced apart from each of the third and fourth surfaces 103 and 104 of the body 100. In this case, it is possible to prevent the coil component 1000 according to the present exemplary embodiment from being short-circuited with other components mounted on outside of a mounting board, or the like in the width direction W.

At least one of distances from each of the third and fourth surfaces 103 and 104 of the body 100 to the pad portions 420 and 520 may be greater than at least one of distances from each of the third and fourth surfaces 103 and 104 of the body 100 to the connection portions 410 and 510. For example, a length d1 of the connection portions 410 and 510 in the width direction W may be shorter than a length d2 of the pad portions 420 and 520 in the width direction W. The sixth surface 106 of the body 100 is used as a mounting surface when the coil component 1000 according to this exemplary embodiment is mounted on a mounting board, and the pad portions 420 and 520 of the external electrodes 400 and 500 may be connected to a connection pad of the mounting board through a bonding member such as solder. In this case, since the length d2 of the pad portions 420 and 520 in the width direction W is greater than the length d1 of the connection portions 410 and 510 in the width direction W, the area of the pad portions 420 and 520 in contact with the bonding member such as solder or the like may be increased to improve a coupling force between the pad portions 420 and 520 and the mounting board. In addition, since the length d1 of the connection portions 410 and 510 in the width direction W is smaller than the length d2 of the pad portions 420 and 520 in the width direction W, a short-circuit with other components mounted adjacently in the length direction on the mounting board may be prevented. That is, a likelihood of a short-circuit with other components maybe reduced by reducing the size (length d1 in the width direction W) of the connection portions 410 and 510 disposed to be most adjacent to other components at the time of mounting, among the components of the external electrodes 400 and 500.

The insulating film IF is disposed between the coil unit 300 and the body 100 and between the support substrate 200 and the body 100. The insulating film IF may be formed on the surfaces of the lead patterns 331 and 332, the coil patterns 311 and 312, the support substrate 200, and the dummy lead patterns 341 and 342, but is not limited thereto. The insulating film IF serves to insulate the coil unit 300 and the body 100 and may include a known insulating material such as parylene or the like, but is not limited thereto. As another example, the insulating film IF may include an insulating material such as an epoxy resin other than parylene. The insulating film IF maybe formed by a vapor deposition method, but is not limited thereto. As another example, the insulating film IF maybe formed by stacking and curing an insulating film for formation of the insulating film IF on both surfaces of the support substrate 200 on which the coil unit 300 is formed or may be formed by applying and curing an insulating paste for formation of the insulating film IF on both surfaces of the support substrate 200 on which the coil unit 300 is formed. Meanwhile, for the reasons described above, the insulating film IF is a component that may be omitted in this exemplary embodiment. That is, if the body 100 has sufficient electrical resistance at a designed operating current and voltage of the coil component 1000 according to the present exemplary embodiment, the insulating film IF may be omitted in this exemplary embodiment.

Surface insulating layers 610, 620, and 630 are disposed on the body 100, and at least portions of the surface insulating layers 610, 620, and 630 fill at least portions of the slit portions S1, S2, S3, and S4. In the case of this exemplary embodiment, the surface insulating layers 610, 620, and 630 include a first insulating layer 610 disposed on the first and second slit portions S1 and S2 and filling at least portions of the third and fourth slit portions S3 and S4 to isolate the connection portions 410 and 510 from the third and fourth surfaces 103 and 104 of the body 100, respectively, a second insulating layer 620 disposed on the sixth surface 106 of the body 100 to expose the pad portions 420 and 520, and a third insulating layer 630 disposed on the first and second surfaces 101 and 102 of the body 100 and covering the connection portions 410 and 510.

The first insulating layer 610 is disposed in the first and second slit portions S1 and S2. An opening 0 exposing the connection portions 410 and 510 is formed in the first insulating layer 610. Specifically, referring to FIG. 4, the first insulating layer 610 is formed to fill the first and second slit portions S1 and S2 and is separated on the inner surfaces of the first and second slits S1 and S2 by the opening 0. As for the first insulating layer 610 disposed in the first and second slit portions S1 and S2, a distance from one surface of the first insulating layer 610 in contact with the inner walls of the first and second slit portions S1 and S2 to the other surface facing one surface of the first insulating layer 610 may correspond to a width of the first and second slit portions S1 and S2 (a distance in the length direction L from the first and second surfaces 101 and 102 of the body 100 to the inner wall of the first and second slit portions S1 and S2). As a result, the other surface of the first insulating layer 610 disposed on the first and second slit portions S1 and S2 may be substantially coplanar with the first and second surfaces 101 and 102 of the body 100. Since the first insulating layer 610 is formed to fill the first and second slit portions S1 and S2 as a whole, an appearance defect of the coil component 1000 according to the present exemplary embodiment may be reduced, compared with a case where the first insulating layer 610 is not formed in the first and second slit portions S1 and S2.

The first insulating layer 610 extends from the first and second slit portions S1 and S2 to fill at least portions of the third and fourth slit portions S3 and S4. In this exemplary embodiment, referring to FIG. 4, the first insulating layer 610 is formed to fill the third and fourth slit portions S3 and S4 . Referring to the first insulating layer 610 disposed in the third and fourth slit portions S3 and S4, a distance from one surface of the first insulating layer 610 in contact with the inner walls of the third and fourth slit portions S3 and S4 to the other surface of the first insulating layer 610 facing one surface thereof may correspond to a width of the third and fourth slit portions S3 and S4 (distance from the third and fourth surfaces 103 and 104 of the body 100 to the inner walls of the third and fourth slit portions S3 and S4 in the width direction W). As a result, the other surface of the first insulating layer 610 disposed on the third and fourth slit portions S3 and S4 may be substantially coplanar with the third and fourth surfaces 103 and 104 of the body 100. Since the first insulating layer 610 is formed to fill the third and fourth slit portions S3 and S4, an appearance defect of the coil component 1000 according to the present exemplary embodiment may be reduced, as compared to a case where the first insulating layer 610 is not formed in the third and fourth slit portions S3 and S4.

The second insulating layer 620 may be disposed on the sixth surface 106 of the body 100 and expose the pad portions 420 and 520. The second insulating layer 620 may be disposed outside both ends of the pad portions 420 and 520 in the width direction W to isolate the pad portions 420 and 520 and the third and fourth surfaces 103 and 104 of the body 100. The second insulating layer 620 may prevent the coil component 1000 according to the present exemplary embodiment from being short-circuited with other components mounted adjacent thereto in the width direction W. In addition, in mounting the coil component 1000 according to the present exemplary embodiment, the second insulating layer 620 may prevent an increase in an effective mounting area occupied by the coil component 1000 according to the present exemplary embodiment in the mounting board due to a bonding member such as solder or the like.

The first insulating layer 610 and the second insulating layer 620 may be integrally formed with each other. As an example, the first insulating layer 610 and the second insulating layer 620 may be formed together in the same process using the same insulating material, and thus, a boundary may not be formed therebetween. As an example, the first and second insulating layers 610 and 620 may be formed by a screen printing method using an insulating paste, an inkjet printing method, or the like, so as to be integrally formed. Meanwhile, in the case of this exemplary embodiment, before forming the external electrodes 400 and 500, the first insulating layer 610 may be formed on the slit portions S1, S2, S3, and S4 and the second insulating layer 620 may be formed on the sixth surface 106 of the body 100. Accordingly, in selectively forming the external electrodes 400 and 500 on the sixth surface 106 of the body 100 and on the inner surfaces of the first and second slit portions S1 and S2, the first and second insulating layers 610 and 620 may serve as masks. As an example, the first and second insulating layers 610 and 620 may serve as a plating resist in forming the external electrodes 400 and 500 by a plating method.

The first and second insulating layers 610 and 620 may be collectively formed on each coil component at a coil bar level in a state before each coil component is individualized. That is, the process of forming the first and second insulating layers 610 may be performed between the aforementioned pre-dicing process and the individualization process (full dicing process).

The third insulating layer 630 is disposed on the first and second surfaces 101 and 102 of the body 100 and covers the connection portions 410 and 510. In this exemplary embodiment, the third insulating layer 630 includes a cover layer 631 covering the first to fifth surfaces 101, 102, 103, 104, and 105 of the body 100 and a finishing layer 632 disposed on the first and second surfaces 101 and 102 to cover the connection portions 410 and 510.

The cover layer 631 is disposed on the first to fifth surfaces 101, 102, 103, 104, and 105 of the body 100 and covers the first insulating layer 610 disposed on the inner surfaces of the slit portions S1, S2, S3, and S4. The cover layer 631 does not extend to the second insulating layer 620 disposed on the sixth surface 106 of the body 100. Meanwhile, the opening 0 may extend to the cover layer 631 to expose the connection portions 410 and 510 to the outside. In this case, the cover layer 631 may serve as a mask together with the first and second insulating layers 610 and 620 in selectively forming the external electrodes 400 and 500 on the body 100. Accordingly, the cover layer 631 maybe formed in a process between a process of forming the first and second insulating layers 610 and 620 and a process of forming the external electrodes 400 and 500. The cover layer 631 is in contact with each of the first to fifth surfaces 101, 102, 103, 104, and 105 of the body 100 and is in contact with the other surface of the first insulating layer 610 on the inner walls of the slit portions S1, S2, S3, and S4. The process of forming the cover layer 631 may be performed after completing the process of individualizing the coil bar.

The finishing layer 632 is disposed on the first and second surfaces 101 and 102 of the body 100 to cover the cover layer 631 and the connection portions 410 and 510, respectively. In the present exemplary embodiment, the first and second insulating layers 610 and 620 may be formed on the surface of the body 100 excluding regions in which the connection portions 410 and 510 and the pad portions 420 and 520 are to be formed and on the inner surfaces of the slit portions S1, S2, S3, and S4, a temporary member may be attached to the region in which the connection portions 410 and 510 and the pad portions 420 and 520 are to be formed, the cover layer 631 may be formed on the first to fifth surfaces 101, 102, 103, 104, and 105 of the body 100, the temporary member may be removed to expose the lead patterns 331 and 332 to the outside, and then the connection portions 410 and 510 and the pad portions 420 and 520 may be formed in the in which where the temporary member was removed. Accordingly, the connection portions 410 and 510 are exposed to the outside without being covered by the cover layer 631. The finishing layer 632 is disposed on each of the first and second surfaces 101 and 102 of the body 100 to cover the connection portions 410 and 510 not covered by the cover layer 631.

Each of the insulating layers 610, 620, and 630 may include a thermoplastic resin such as polystyrene, vinyl acetate, polyester, polyethylene, polypropylene, polyamide, rubber, acrylic, and the like, a thermosetting resin such as phenol, epoxy, urethane, melamine, alkyd, and the like, a photosensitive resin, parylene, SiOx, or SiNx. Each of the insulating layers 610, 620, and 630 may further include an insulating filler such as an inorganic filler, but is not limited thereto.

Figure 10:
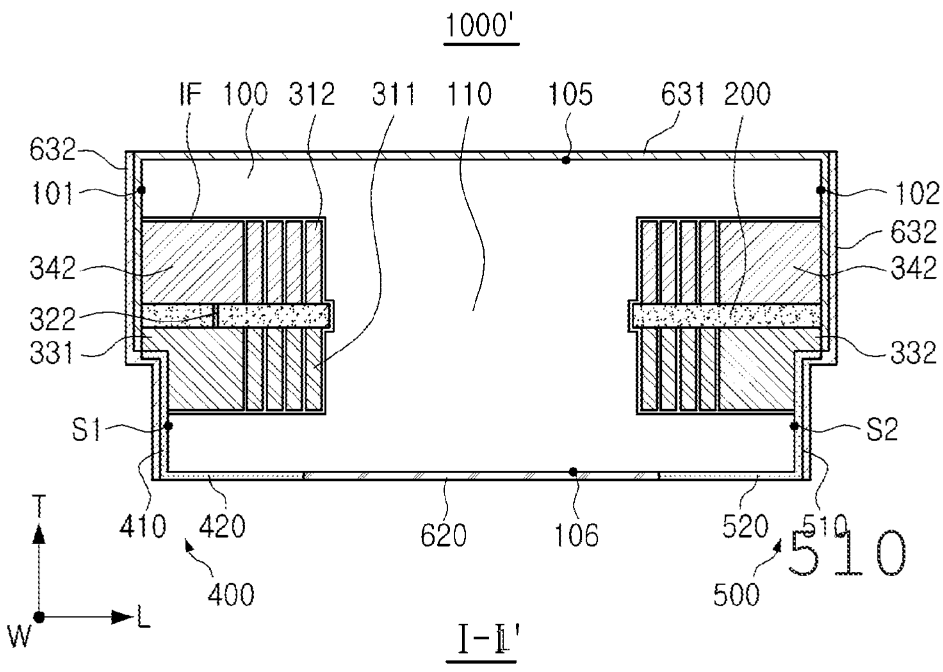
FIGS. 10 and 11 are views schematically illustrating modifications of a coil component according to a first exemplary embodiment in the present disclosure, respectively, which correspond to FIG. 7.
Figure 11:
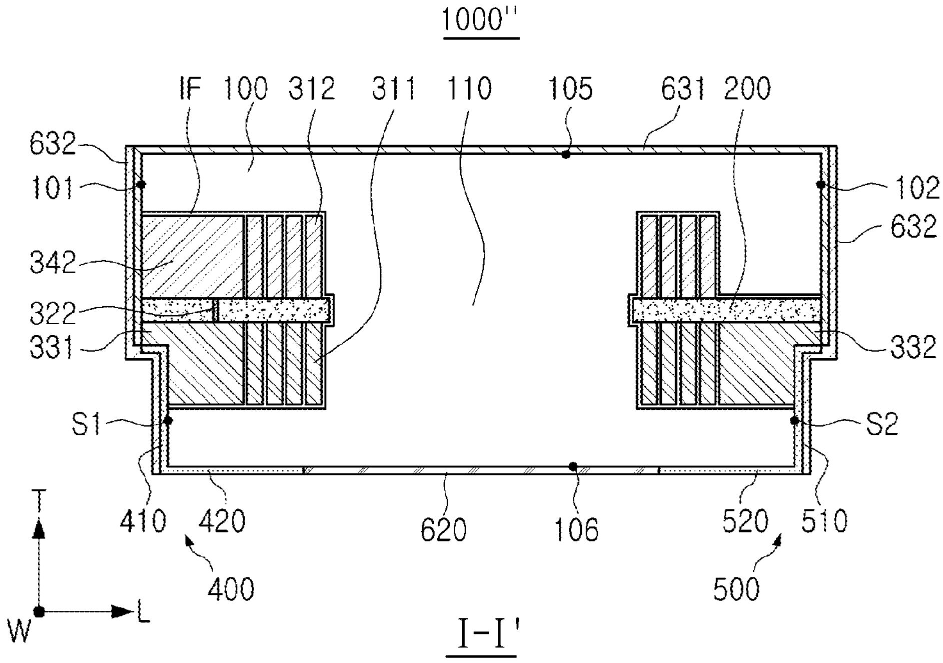

FIGS. 10 and 11 are views schematically illustrating modifications of a coil component according to a first exemplary embodiment in the present disclosure, which correspond to FIG. 7.

Referring to FIG. 10, in the case of a modification of the first exemplary embodiment in the present disclosure, the aforementioned third via 323 may be omitted. That is, referring to FIG. 9, the second dummy lead pattern 342 is irrelevant to an electrical connection between the coil unit 300 and the external electrodes 400 and 500, and thus, in this modification, the third via 323 for connection between the 332 and the second dummy lead pattern 342 is omitted. However, in the case of the present modification, since the second dummy lead pattern 342 is not omitted, warpage of the support substrate 200 during the process may be minimized.

Referring to FIG. 11, in the case of another modification of the first exemplary embodiment in the present disclosure, the third via 323 may be omitted as in the modification shown in FIG. 10, and in addition, the second dummy lead pattern 342 may be omitted. In this modification, an effective volume of a magnetic material of the body 100 maybe increased by a volume corresponding to a volume of the second dummy lead pattern 342.

Second Exemplary Embodiment

Figure 12:
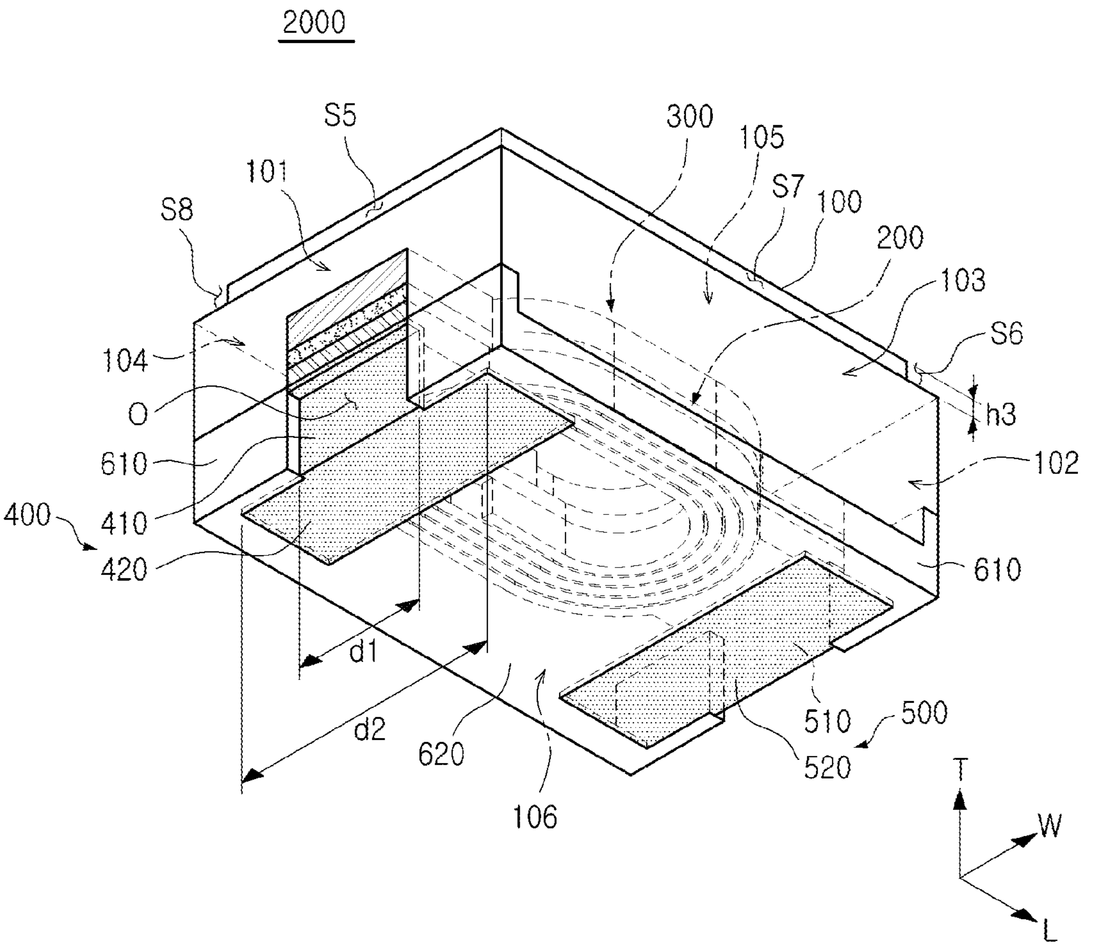
FIG. 12 is a view schematically illustrating a coil component according to a second exemplary embodiment in the present disclosure.
Figure 13:
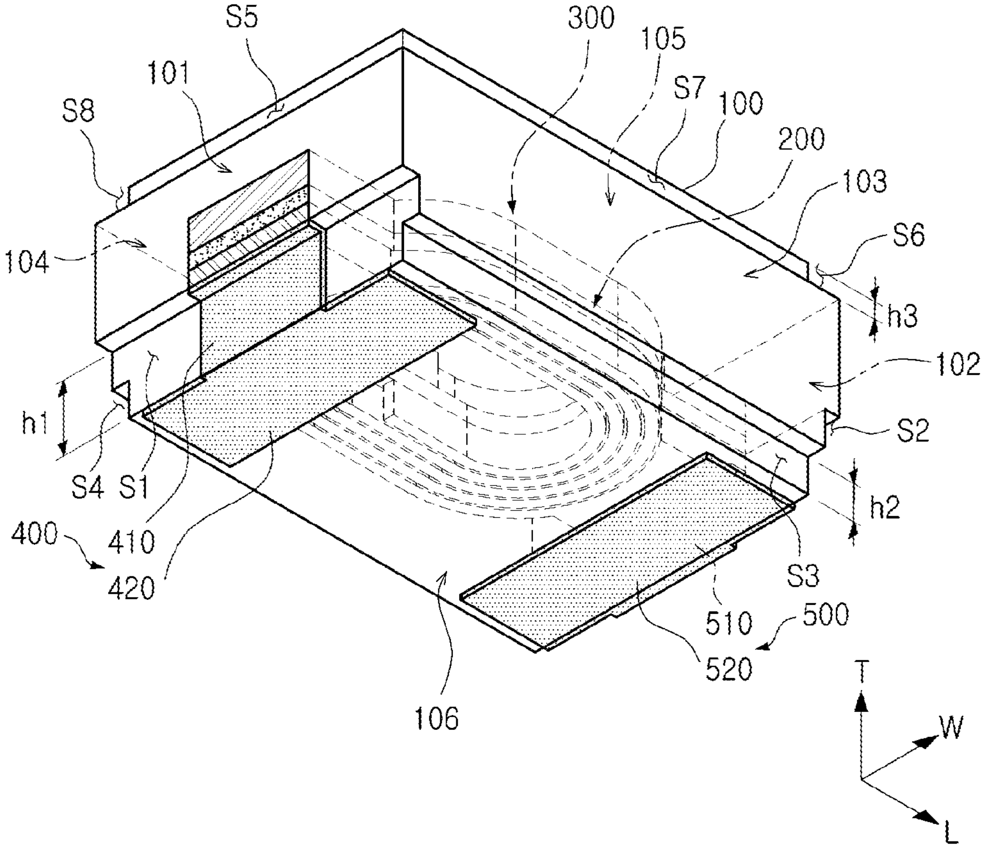
FIG. 13 is a view illustrating a configuration in which first and second insulating layers of FIG. 12 are omitted.

FIG. 12 is a view schematically illustrating a coil component according to a second exemplary embodiment in the present disclosure. FIG. 13 is a view illustrating a configuration in which first and second insulating layers in FIG. 12 are omitted. Meanwhile, in FIG. 12, for convenience of description, the third insulating layer of a coil component 2000 according to the second exemplary embodiment in the present disclosure is omitted.

Referring to FIGS. 1 through 11, and 12 and 13, the coil component 2000 according to a second exemplary embodiment in the present disclosure includes slit portions S1, S2, S3, S4, S5, S6, S7, and S8 different from those of the coil component 1000 according to the first exemplary embodiment in the present disclosure. Therefore, in describing the present exemplary embodiment, only the slit portions S5, S6, S7, and S8 different from the first exemplary embodiment will be described. For the rest of the configuration of the present exemplary embodiment, the description in the first exemplary embodiment in the present disclosure may be applied as is. Also, the modifications described in the first exemplary embodiment in the present disclosure may be applied to the present exemplary embodiment as is.

When comparing FIGS. 4 and 5 and FIGS. 12 and 13, the coil component 2000 according to the present exemplary embodiment further includes fifth to eighth slit portions S5, S6, S7, and S8.

The fifth to eighth slit portions S5, S6, S7, and S8 are formed at edge portions between each of the first to fourth surfaces 101, 102, 103, and 104 of the body 100 and the fifth surface 105 of the body 100. Specifically, the fifth slit portion S5 is formed at the edge portion between the first surface 101 of the body 100 and the fifth surface 105 of the body 100, the sixth slit portion S6 is formed at the edge portion between the second surface 102 of the body 100 and the fifth surface 105 of the body 100, the seventh slit portion S7 is formed at the edge portion between the third surface 103 and the body 100 and the fifth surface 105 of the body 100, and the eighth slit portion S8 is formed at the edge portion between the fourth surface 104 of the body 100 and the fifth surface 105 of the body 100. In this exemplary embodiment, not only the first to fourth slit portions S1, S2, S3, and S4 are formed at the edge portions of the sixth surface 106 of the body 100 but also the fifth to eighth slit portions S5, S6, S7, and S8 are also formed at the edge portions of the fifth surface 105 of the body 100. Accordingly, a chipping defect that occurs on the fifth surface 105 side of the body 100 during full dicing may be minimized. A depth h3 of the fifth to eighth slit portions S5, S6, S7, and S8 may be substantially equal to or substantially the same as the depth h2 of the third and fourth slit portions S3 and S4, but the scope of the present disclosure is not limited thereto.

One depth one and another depth being substantially the same or substantially equal to each other may mean that the one depth and the another depth are exactly the same or exactly equal to each other, and also mean that a difference between the one depth and the another depth is within a process error or a measurement error recognizable by one of ordinary skill in the art. The measurement of the depth h2, the depth h3, the depth h1, or a distance between two elements may be performed through the aforementioned method based on an optical microscope or a scanning electron microscope (SEM) image to measure the length, width, and/or thickness of the electronic component.

In this exemplary embodiment, the first and second insulating layers 610 and 620 may be disposed also on the fifth to eighth slit portions S5, S6, S7, and S8 and on the fifth surface 105 of the body 100, as well as on the first to fourth slit portions S1, S2, S3, and S4 and the sixth surface 106 of the body 100, but the scope of the present exemplary embodiment is not limited thereto.

Third Exemplary Embodiment

Figure 14:
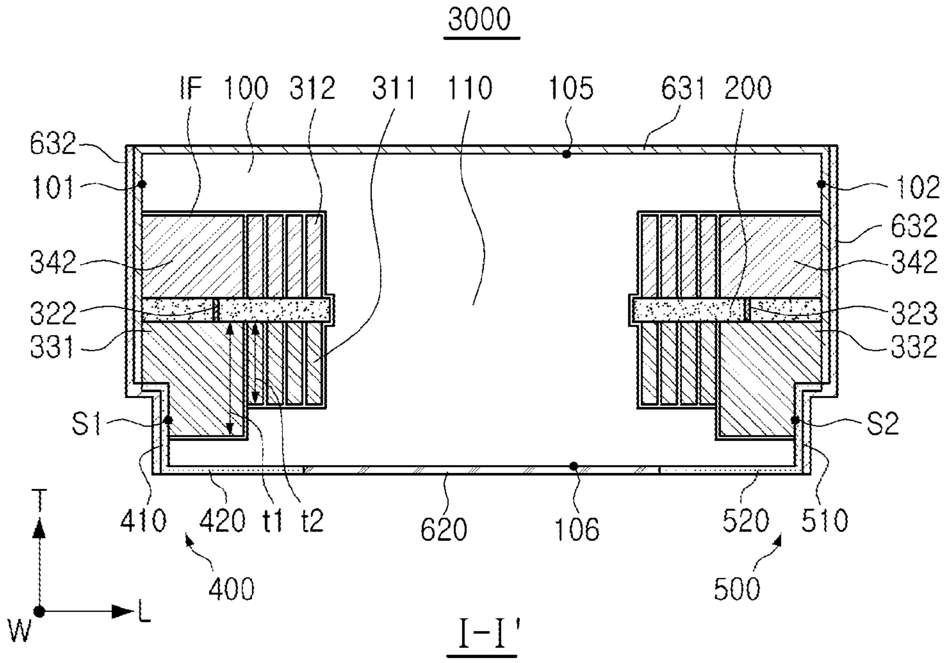
FIG. 14 is a view schematically illustrating a coil component according to a third exemplary embodiment in the present disclosure, which corresponds to FIG. 7.

FIG. 14 is a view schematically illustrating a coil component according to a third exemplary embodiment in the present disclosure, which corresponds to FIG. 7.

Referring to FIGS. 1 through 11, 12 and 13, and 14, a coil component 3000 according to the third exemplary embodiment in the present disclosure includes lead patterns 331 and 332 different from those of the coil components 1000 and 2000 according to the first and second exemplary embodiments of the present disclosure. Therefore, in describing the present exemplary embodiment, only the lead patterns 331 and 332 different from those of the first and second exemplary embodiments will be described. For the rest of the configuration of this exemplary embodiment, the descriptions in the first and second exemplary embodiments of the present disclosure may be applied as is. In addition, the modifications described in the first exemplary embodiment in the present disclosure may be applied to the present exemplary embodiment as is.

Referring to FIG. 14, in the coil unit 300 applied to the present exemplary embodiment, a thickness t1 of each of the lead patterns 331 and 332 is greater than a thickness t2 of the first coil pattern 311. In the present exemplary embodiment, by forming the thickness t1 of each of the lead patterns 331 and 332 to be greater than the thickness t2 of the first coil pattern 311, the depth h1 of the first and second slit portions S1 and S2 may be formed to be relatively shallow. Accordingly, the coil component according to the present exemplary embodiment may reduce loss of the magnetic material of the body 100 that occurs when the first and second slit portions S1 and S2 are formed.

As set forth above, according to exemplary embodiments in the present disclosure, a degradation of the characteristics of the coil component due to a leakage current may be prevented.

While exemplary embodiments have been shown and described above, it will be apparent to those skilled in the art that modifications and variations could be made without departing from the scope of the present disclosure as defined by the appended claims.

What is claimed is:

1. A coil component comprising:

a body including one surface, one end surface and another end surface connected to the one surface, respectively, and opposing each other, and one side surface and another side surface connecting the one end surface and the another end surface, respectively, and opposing each other;

a coil unit disposed in the body and including first and second lead patterns;

a first slit portion disposed in an edge portion between the one end surface of the body and the one surface of the body and exposing the first lead pattern;

a second slit portion disposed in an edge portion between the another end surface of the body and the one surface of the body and exposing the second lead pattern;

a third slit portion disposed in an edge portion between the one side surface of the body and the one surface of the body to extend from the first slit portion to the second slit portion;

a fourth slit portion disposed in an edge portion between the another side surface of the body and the one surface of the body to extend from the first slit portion to the second slit portion, wherein at least one of depths of the third and fourth slit portions from the one surface of the body is shallower than at least one of depths of the first and second slit portions from the one surface of the body;

first and second external electrodes spaced apart from each other on the one surface of the body and extending to the first and second slit portions so as to be in contact with the first and second lead patterns, respectively; and a surface insulating layer disposed on the body and disposed in at least portions of the first, second, third, and fourth slit portions.

2. The coil component of claim 1, wherein a depth of each of the third and fourth slit portions is shallower than a depth of each of the first and second slit portions.

3. The coil component of claim 1, wherein the first external electrode includes a first pad portion disposed on the one surface of the body and a first connection portion connected to the first pad portion and disposed on an inner surface of the first slit portion so as to be in contact with the first lead pattern, and the second external electrode includes a second pad portion disposed on the one surface of the body and a second connection portion connected to the second pad portion and disposed on an inner surface of the second slit portion so as to be in contact with the second lead pattern.

4. The coil component of claim 3, wherein the first connection portion and the second connection portion are disposed at central portions of the first and second slit portions and spaced apart from the one side surface and the another side surface of the body, respectively.

5. The coil component of claim 3, wherein the surface insulating layer includes:

a first insulating layer disposed in the first and second slit portions to isolate the first and second connection portions from each of the one side surface and the another side surface of the body and disposed in at least portions of the third and fourth slit portions;

a second insulating layer disposed on the one surface of the body and exposing the first pad portion and the second pad portion; and a third insulating layer disposed on the one end surface of the body and the another end surface of the body and covering the first connection portion and the second connection portion.

6. The coil component of claim 5, wherein the first insulating layer and the second insulating layer are integral.

7. The coil component of claim 5, wherein the third insulating layer covers at least a portion of the first insulating layer disposed on the first and second slit portions.

8. The coil component of claim 3, wherein the first pad portion and the second pad portion are spaced apart from the one side surface and the another side surface of the body, respectively.

9. The coil component of claim 8, wherein at least one of distances from each of the one side surface and the another side surface of the body to the first and second pad portions is shorter than at least one of the distances from each of the one side surface and the another side surface of the body to the first and second connection portions.

10. The coil component of claim 1, wherein the body further includes another surface facing one surface of the body, and further includes fifth, sixth, seventh, and eighth slit portions respectively disposed in edge portions between the another surface of the body and each of the one side surface, the another side surface, the one end surface, and the another end surface of the body.

11. The coil component of claim 10, wherein a depth of the third and fourth slit portions is substantially the same as a depth of the fifth, sixth, seventh, and eighth slit portions.

12. The coil component of claim 1, further comprising a support substrate disposed in the body, wherein the coil unit includes:

a first coil pattern disposed on one surface of the support substrate facing the one surface of the body;

a second coil pattern disposed on another surface of the support substrate facing one surface of the support substrate; and a first via disposed in the support substrate and connecting inner ends of the first and second coil patterns, wherein the first lead pattern is disposed to be spaced apart from the first coil pattern on the one surface of the support substrate, and the second lead pattern is disposed on the one surface of the support substrate and connected to the first coil pattern.

13. The coil component of claim 12, wherein the coil unit further includes:

a first dummy lead pattern disposed on the another surface of the support substrate and connected to the second coil pattern; and a second via disposed in the support substrate and connecting the first lead pattern and the first dummy lead pattern.

14. The coil component of claim 13, wherein the coil unit further includes:

a second dummy lead pattern disposed to be spaced apart from each of the second coil pattern and the first dummy lead pattern on the another surface of the support substrate.

15. The coil component of claim 14, wherein the coil unit further includes a third via disposed in the support substrate and connecting the second lead pattern and the second dummy lead pattern.

16. The coil component of claim 12, wherein a thickness of each of the first and second lead patterns is greater than a thickness of the first coil pattern.

17. A coil component comprising:

a body including one surface, one end surface and another end surface connected to the one surface, respectively, and opposing each other, and one side surface and another side surface connecting the one end surface and the another end surface, respectively, and opposing each other;

a coil disposed in the body, and including a coil pattern and first and second lead patterns connected to the coil pattern;

a first slit portion disposed in an edge portion between the one end surface of the body and the one surface of the body and exposing the first lead pattern;

a second slit portion disposed in an edge portion between the another end surface of the body and the one surface of the body and exposing the second lead pattern;

a third slit portion disposed in an edge portion between the one side surface of the body and the one surface of the body to extend from the first slit portion to the second slit portion;

a fourth slit portion disposed in an edge portion between the another side surface of the body and the one surface of the body to extend from the first slit portion to the second slit portion;

first and second external electrodes spaced apart from each other on the one surface of the body and extending to the first and second slit portions so as to be in contact with the first and second lead patterns, respectively; and a surface insulating layer disposed on the body and disposed in at least portions of the first, second, third, and fourth slit portions, wherein the coil pattern includes an upper surface and a lower surface opposing each other, the lower surface being closer to the one surface than the upper surface, and a distance from the lower surface of the coil pattern to the one surface is greater than depths of the third slit portion and the fourth slit portion.

18. The coil component of claim 17, wherein the first external electrode includes a first pad portion disposed on the one surface of the body and a first connection portion connected to the first pad portion and disposed on an inner surface of the first slit portion so as to be in contact with the first lead pattern, and the second external electrode includes a second pad portion disposed on the one surface of the body and a second connection portion connected to the second pad portion and disposed on an inner surface of the second slit portion so as to be in contact with the second lead pattern.

19. The coil component of claim 18, wherein the first connection portion and the second connection portion are disposed at central portions of the first and second slit portions and spaced apart from the one side surface and the another side surface of the body, respectively.

20. The coil component of claim 18, wherein the surface insulating layer includes:

a first insulating layer disposed in the first and second slit portions to isolate the first and second connection portions from each of the one side surface and the another side surface of the body and disposed in at least portions of the third and fourth slit portions;

a second insulating layer disposed on the one surface of the body and exposing the first pad portion and the second pad portion; and a third insulating layer disposed on the one end surface of the body and the another end surface of the body and covering the first connection portion and the second connection portion.

21. The coil component of claim 18, wherein the first pad portion and the second pad portion are spaced apart from the one side surface and the another side surface of the body, respectively.

22. The coil component of claim 17, wherein the body further includes another surface facing one surface of the body, and further includes fifth, sixth, seventh, and eighth slit portions respectively disposed in edge portions between another surface of the body and each of the one side surface, the another side surface, the one end surface, and the another end surface of the body.

23. The coil component of claim 22, wherein a depth of the third and fourth slit portions is substantially the same as a depth of the fifth, sixth, seventh, and eighth slit portions.

24. A coil component comprising:

a body;

a coil unit disposed in the body;

a first slit portion extending between surfaces of the body in a width direction of the body to expose a portion of the coil unit, and disposed on one side of the body in a length direction of the body;

a second slit portion extending between surfaces of the body in the length direction of the body, intersecting with the first slit portion, and disposed on one side of the body in the width direction of the body;

a third slit portion extending between the surfaces of the body in the width direction of the body to expose another portion of the coil unit, and disposed on another side of the body in the length direction of the body;

a fourth slit portion extending between the surfaces of the body in the length direction of the body, and disposed on another side of the body in the width direction of the body; and an external electrode disposed on one surface of the body, and extending to the first slit portion so as to connect to the portion of the coil unit, wherein a depth of the second slit portion from the one surface of the body is less than a depth of the first slit portion from the one surface of the body.

25. The coil component of claim 24, wherein the depth of the second slit portion from the one surface of the body and a depth of fourth slit portion from the one surface of the body are less than the depth of the first slit portion from the one surface of the body.

* * * * *